United States Patent
Minakuchi et al.

(10) Patent No.: US 11,401,397 B2
(45) Date of Patent: Aug. 2, 2022

(54) METHOD FOR PRODUCING POROUS MATERIAL OF WATER-SOLUBLE POLYMER

(71) Applicants: TOYOTA JIDOSHA KABUSHIKI KAISHA, Toyota (JP); OSAKA UNIVERSITY, Suita (JP)

(72) Inventors: Akio Minakuchi, Okazaki (JP); Tomoyuki Uezono, Okazaki (JP); Hiroshi Uyama, Suita (JP); Chiaki Yoshizawa, Suita (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 16/425,219

(22) Filed: May 29, 2019

(65) Prior Publication Data

US 2019/0367700 A1 Dec. 5, 2019

(30) Foreign Application Priority Data

May 30, 2018 (JP) .............................. JP2018-103453

(51) Int. Cl.
*C08J 9/28* (2006.01)

(52) U.S. Cl.
CPC ....... *C08J 9/283* (2013.01); *C08J 2201/0504* (2013.01); *C08J 2301/28* (2013.01); *C08J 2329/04* (2013.01)

(58) Field of Classification Search
CPC .. C08J 9/28–283; C08J 2201/05–0504; B01D 71/08–22
See application file for complete search history.

(56) References Cited

U.S. PATENT DOCUMENTS

| | | | | |
|---|---|---|---|---|
| 3,347,702 A | * | 10/1967 | Clancy | G03G 5/0503 430/134 |
| 3,819,542 A | * | 6/1974 | Kreider | C08J 9/28 264/41 |
| 4,663,358 A | | 5/1987 | Hyon et al. | |
| 2006/0154067 A1 | * | 7/2006 | Cooper | C08J 9/28 428/402 |
| 2007/0225388 A1 | * | 9/2007 | Cooper | C08J 9/28 521/64 |
| 2007/0241077 A1 | | 10/2007 | Kochi et al. | |
| 2015/0118320 A1 | | 4/2015 | Inokuchi et al. | |

FOREIGN PATENT DOCUMENTS

| | | |
|---|---|---|
| DE | 1253050 B | 10/1967 |
| DE | 102016214304 A1 | 2/2017 |
| JP | 46-21446 B | 6/1971 |
| JP | 6-78460 B2 | 10/1994 |
| JP | 11-319402 A | 11/1999 |
| JP | 2012-251057 A | 12/2012 |
| JP | 2014-132057 A | 7/2014 |
| JP | 2014-198835 A | 10/2014 |
| KR | 10-2015-0050387 A | 5/2015 |
| WO | 2006/013812 A1 | 2/2006 |
| WO | WO-2016089309 A1 * | 6/2016 ........... A61K 9/5031 |

OTHER PUBLICATIONS

Butyl Carbitol Acetate Information. Dow Chemical. https://www.dow.com/en-us/pdp.butyl-carbitol-acetate.85159z.html. As viewed on Oct. 6, 2020. (Year: 2020).*
Oil and Colour Chemists' Association, Austrailia. Surface Coatings: vol. 1—Raw Materials and Their Usage. Springer Science+ Business Media Dordrecht. 1983. pp. 244-256. (Year: 1983).*
Basic Principles of Freeze Drying. SPScientific. https://www.spscientific.com/freeze-drying-lyophilization-basics/. As viewed on Apr. 11, 2015. (Year: 2015).*
Shekhawat et al. Fuel Cells: Technologies for Fuel Processing. Elsevier B.V. 2011. Section 3.2.3. Kerosene. pp. 38-40. (Year: 2011).*
Definition of evaporate. Dictionary.com. https://www.dictionary.com/browse/evaporate?s=t. As viewed on Mar. 24, 2021. (Year: 2021).*
Machine Translation of JPH11-319402A. Nov. 24, 1999. (Year: 1999).*

* cited by examiner

*Primary Examiner* — Stephen E Rieth

(74) *Attorney, Agent, or Firm* — Sughrue Mion, PLLC

(57) ABSTRACT

The disclosure provides a very simple and convenient method for producing a porous material of a water-soluble polymer. The herein disclosed method for producing a porous material of a water-soluble polymer includes a step of preparing an emulsion containing a water-soluble polymer, water, and a dispersoid, wherein the water-soluble polymer is dissolved and the dispersoid is dispersed in the emulsion, and a step of evaporating and thereby removing the water and the dispersoid from the emulsion. The boiling point of the dispersoid is higher than the boiling point of water. The solubility of the water-soluble polymer in the dispersoid is lower than the solubility of the water-soluble polymer in water.

4 Claims, 1 Drawing Sheet

METHOD FOR PRODUCING POROUS MATERIAL OF WATER-SOLUBLE POLYMER

BACKGROUND OF THE INVENTION

1. Field of the Invention

The present disclosure relates to a method for producing a porous material of a water-soluble polymer. The present application claims priority to Japanese Patent Application No. 2018-103453 filed on May 30, 2018, the entire contents of which are incorporated into the present specification by reference.

2. Description of the Related Art

Porous materials of water-soluble polymers can exhibit a variety of properties, for example, light weight, cushioning characteristics, heat-insulating properties, sound absorption, separation properties, adsorption properties, and so forth. Porous materials of water-soluble polymers are thus used in a wide variety of applications such as, for example, packing and packaging materials, construction materials, sound-absorbing materials, cleaning products, cosmetic products, separation membranes, adsorbents, carriers for purification, catalyst carriers, and culture substrates.

Viewed in terms of, for example, production costs, the porous material of a water-soluble polymer is desirably produced by a simple and convenient method. As a simple and convenient method for producing a porous material of polyvinyl alcohol, which is the water-soluble polymer, Japanese Patent Application Laid-open No. 2012-251057 discloses a production method that includes a step of preparing a polyvinyl alcohol solution by adding a water-miscible first solvent to an aqueous polyvinyl alcohol solution while heating, obtaining a molded article by cooling the polyvinyl alcohol solution to induce precipitation, immersing the molded article in a second solvent, and replacing the water and/or the first solvent present in the molded article with the second solvent to obtain a porous material containing polyvinyl alcohol as its main component. The volume proportion between the water and the first solvent (first solvent/water) is 0.5 to 1.1.

SUMMARY OF THE INVENTION

As a result of intensive investigations, the present inventors have found that, with regard to the simple and convenient production of porous material, there is room for improvement in the aforementioned conventional production method.

An object of the present disclosure is therefore to provide a very simple and convenient method for producing a porous material of a water-soluble polymer.

The herein disclosed method for producing a porous material of a water-soluble polymer includes a step of preparing an emulsion containing a water-soluble polymer, water, and a dispersoid, wherein the water-soluble polymer is dissolved and the dispersoid is dispersed in the emulsion, and a step of evaporating and thereby removing the water and the dispersoid from the emulsion. The boiling point of the dispersoid is higher than the boiling point of water. The solubility of the water-soluble polymer in the dispersoid is lower than the solubility of the water-soluble polymer in water.

Porous material of a water-soluble polymer can be produced in accordance with this constitution through easy procedures, i.e., the preparation of an emulsion and the evaporation of water and the dispersoid. A very simple and convenient method for producing a porous material of a water-soluble polymer is thus provided in accordance with this constitution.

DESCRIPTION OF THE PREFERRED EMBODIMENT(S)

Figure 1:
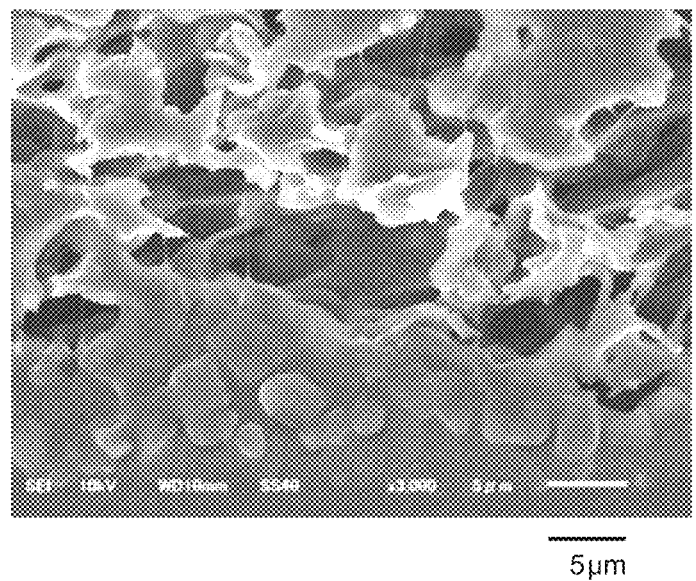
FIG. 1 is an SEM photograph of a cross section of the thin film obtained in Example 1.

The method according to the present disclosure for producing a porous material of a water-soluble polymer includes a step of preparing an emulsion containing a water-soluble polymer, water, and a dispersoid, wherein the water-soluble polymer is dissolved and the dispersoid is dispersed in the emulsion (also referred to as the "emulsion preparation step" in the following), and a step of evaporating and thereby removing the water and the dispersoid from this emulsion (also referred to as the "dispersoid removal step" in the following). The boiling point of the dispersoid is higher than the boiling point of water. The solubility of the water-soluble polymer in the dispersoid is lower than the solubility of the water-soluble polymer in water.

The emulsion preparation step will be described first. There are no particular limitations on the water used in the present disclosure, but the use of deionized water, ultrafiltered water, reverse-osmosis water, distilled water, or ultrapure water is desired from the standpoint of preventing the admixture of impurities, while deionized water is more desired. The water is generally used in an amount that can completely dissolve the water-soluble polymer and can disperse the dispersoid.

In this specification, "water-soluble polymer" refers to a polymer that has a solubility in water at 25° C. of at least 1 mass %. The water-soluble polymer used for the present disclosure has a solubility in water at 25° C. desirably of at least 5 mass % and more desirably at least 10 mass %. The water-soluble polymer used for the present disclosure can be exemplified by hydroxyl group-containing water-soluble polymers such as polyvinyl alcohol-type polymers; amide group-containing water-soluble polymers such as polyvinylpyrrolidone, polyacrylamide, poly(N,N-dimethylacrylamide), poly(N-vinylacetamide), poly-N-isopropylacrylamide, polyoxazoline (for example, poly(2-methyl-2-oxazoline), poly(2-ethyl-2-oxazoline), and poly(2-propyl-2-oxazoline)), water-soluble polyamides, and water-soluble polyamideimides; ether bond-containing water-soluble polymers such as polyethylene glycol, polypropylene glycol, and polyvinyl methyl ether; amino group-containing water-soluble polymers such as polyethyleneimine, polyvinylamine, and polyallylamine; and carboxyl group-containing water-soluble polymers such as polyacrylic acid and polymethacrylic acid. Water-soluble polysaccharides such as the following may also be used as the hydroxyl group-containing water-soluble polymer: pullulan, amylose, starch, starch derivatives, cellulose ethers (for example, hydroxypropyl cellulose, hydroxyethyl cellulose, hydroxymethyl cellulose, and carboxymethyl cellulose), xanthan gum, chitosan, alginic acid, and hyaluronic acid. Carboxymethyl cellulose, alginic acid, and hyaluronic acid are also carboxyl group-containing water-soluble polymers. Chitosan is also an amino group-containing water-soluble polymer. The water-soluble polymer is desirably a hydroxyl group-containing water-soluble polymer and is more desirably a polyvinyl alcohol-type polymer or a cellulose ether and is still more desirably a polyvinyl alcohol-type polymer.

In this Specification, "polyvinyl alcohol-type polymer" refers to a polymer that contains the vinyl alcohol unit accounting for at least 50 mol % of the total monomer units. The polyvinyl alcohol-type polymer used in the present disclosure may thus include a monomer unit (also referred to below as the "other monomer unit") other than the vinyl alcohol unit. This other monomer unit can be exemplified by vinyl ester units, e.g., a vinyl acetate unit and so forth, as derived from vinyl esters for production. Thus, the polyvinyl alcohol-type polymer may be a polyvinyl alcohol having a degree of saponification of 100 mol %, but may also be a partially saponified polyvinyl alcohol. The degree of saponification of the polyvinyl alcohol-type polymer is desirably at least 60 mol %, more desirably at least 70 mol %, and still more desirably at least 80 mol %. The degree of saponification of the polyvinyl alcohol-type polymer can be measured, for example, in accordance with JIS K 6726: 1944. The following are additional examples of the other monomer unit: α-olefin units such as ethylene unit and propylene unit; (meth)acrylic acid units; (meth)acrylate ester units; unsaturated dicarboxylic acid units such as maleic acid unit, itaconic acid unit, and fumaric acid unit; vinyl ether units such as methyl vinyl ether unit and ethyl vinyl ether unit; nitrile units such as acrylonitrile unit and methacrylonitrile unit; and vinyl halide units such as vinyl chloride unit and vinyl fluoride unit.

The average degree of polymerization of the water-soluble polymer is not particularly limited, but is desirably not less than 80 and not more than 30,000 and is more desirably not less than 100 and not more than 20,000. The average degree of polymerization of the water-soluble polymer can be determined, for example, by NMR measurements.

The amount of use of the water-soluble polymer is not particularly limited, but the water-soluble polymer is desirably used at an amount of no less than 1 part by mass and no more than 40 parts by mass per 100 parts by mass of the water. The state of the pores in the resulting porous material (for example, the porosity, pore diameter, and so forth) can be controlled by changing the amount of the water-soluble polymer relative to the water (i.e., the concentration of the water-soluble polymer in the water). In particular, the pore diameter tends to be smaller when the amount of water-soluble polymer relative to the water is increased.

The emulsion in the present disclosure is an O/W emulsion. The dispersoid is thus dispersed in a liquid state (particularly droplets) in an aqueous solution of the water-soluble polymer. As a consequence, a liquid not compatible with water at least at a prescribed temperature (for example, 25° C.) is used for the dispersoid. In addition, the boiling point of the dispersoid used in the present disclosure is higher than the boiling point of water (100° C.) and is desirably at least 100° C. higher than the boiling point of water (i.e., the boiling point of the dispersoid is desirably at least 200° C.). The solubility of the water-soluble polymer in the dispersoid is lower than the solubility of the water-soluble polymer in water. The solubility of the water-soluble polymer in the dispersoid at 25° C. is desirably less than 1 mass %, more desirably not more than 0.5 mass %, and still more desirably not more than 0.2 mass %.

The value of the solubility parameter (SP value) of the dispersoid is not particularly limited. In order to achieve a greater emulsion stability and to have porosification develop in a more uniform manner, the solubility parameter of the dispersoid is desirably at least 5 $(cal/cm^3)^{1/2}$ smaller than the SP value of water (i.e., 23.4 $(cal/cm^3)^{1/2}$). Thus, the SP value of the dispersoid is desirably not greater than 18.4 $(cal/cm^3)^{1/2}$ and is more desirably not less than 5 $(cal/cm^3)^{1/2}$ and not more than 15 $(cal/cm^3)^{1/2}$.

The type of the dispersoid is not particularly limited as long as the dispersoid has a boiling point higher than that of water, does not dissolve more water-soluble polymer than water, and can disperse in a liquid state in the aqueous water-soluble polymer solution. Suitable examples of the dispersoid are alkane compounds such as decane, undecane, dodecane, tridecane, tetradecane, and pentadecane; carbonate compounds (particularly cyclic carbonate compounds) such as propylene carbonate (particularly 2-oxo-4-methyl-1,3-dioxolane) and butylene carbonate (particularly 4-ethyl-1,3-dioxolan-2-one); and silicone compounds such as decamethylcyclopentasiloxane. Carbonate compounds (particularly cyclic carbonate compounds) are desired from the standpoint of facilitating the generation of uniform pores.

The amount of use of the dispersoid is not particularly limited, but desirably at least 10 parts by mass and not more than 400 parts by mass of the dispersoid is used per 100 parts by mass of water. The state of the pores in the resulting porous material (for example, the porosity, pore diameter, and so forth) can be controlled by changing the amount of the dispersoid relative to the water. In particular, the porosity tends to be higher when the amount of dispersoid relative to the water is increased.

A surfactant may be added during preparation of the emulsion. The emulsion may thus further contain a surfactant. The addition of a surfactant enables the formation of a more stable emulsion. In addition, the state of the pores (for example, porosity, pore diameter, and so forth) in the resulting porous material can be controlled by adjusting the type and amount of the surfactant. The surfactant can be exemplified by nonionic surfactants, anionic surfactants, cationic surfactants, and amphoteric surfactants. Nonionic surfactants and anionic surfactants are desired among the preceding.

The nonionic surfactant can be exemplified by polyhydric alcohol/fatty acid esters, polyoxyalkylene alkylene glycols, polyoxyalkylene alkyl ethers, and the alkylene oxide adducts of higher fatty acids. Specific examples are sorbitan monooleate, sorbitan monolaurate, sorbitan monostearate, sorbitan monopalmitate, sorbitan distearate, sorbitan tristearate, sorbitan trioleate, polyglyceryl laurate, polyglyceryl myristate, polyglyceryl oleate, polyglyceryl stearate, polyethylene glycol, polypropylene glycol, polyoxyethylene polyoxypropylene glycol, polyoxyethylene lauryl ether, polyoxyethylene polyoxypropylene lauryl ether, polyoxyethylene cetyl ether, polyoxyethylene oleyl ether, polyoxyethylene polyoxypropylene oleyl ether, polyoxyethylene laurate, polyoxyethylene polyoxypropylene laurate, polyoxyethylene oleate, and polyoxyethylene polyoxypropylene stearate.

The anionic surfactant can be exemplified by alkyltrimethylammonium salts, dialkyldimethylammonium salts, and alkylbenzyldimethylammonium salts. Specific examples are dodecyltrimethylammonium chloride, octyldodecyldimethylammonium chloride, didecyldimethylammonium chloride, and decylisononyldimethylammonium chloride. The salts of anionic group-containing polymers, e.g., the ammonium salts of acrylic copolymers, may also be used.

The cationic surfactant can be exemplified by fatty acid salts, alkyl sulfate salts, alkyl polyoxyethylene sulfate salts, alkylbenzenesulfonate salts, alkyl phosphate salts, and sulfosuccinate salts. Specific examples are sodium linoleate, sodium oleate, sodium dodecylsulfonate, sodium polyoxyethylene lauryl ether sulfate, sodium dodecylbenzenesulfonate, sodium polyoxyethylene alkyl ether phosphate, and sodium ethylhexyl sulfosuccinate.

The amphoteric surfactant can be exemplified by alkyldimethylamine oxide and alkylcarboxybetaine. Specific examples are dodecyldimethylamine oxide, lauryldimethylamine oxide, dodecyldimethylcarboxybetaine, and dodecyldimethylamide propylcarboxybetaine.

The amount of use of the surfactant is not particularly limited and may be selected as appropriate depending the type and so forth of the water-soluble polymer, water, and dispersoid, and surfactant used. The amount of surfactant is, for example, not less than 0.01 parts by mass and not more than 30 parts by mass per 100 parts by mass of the water.

Components other than the water, dispersoid, and surfactant may be added for the purpose of, for example, further stabilizing the emulsion and improving the properties of the resulting porous material.

The method for preparing the emulsion is not particularly limited. Advantageously, an aqueous solution of the water-soluble polymer is prepared first. This is followed by the addition of the dispersoid and optional components, e.g., surfactant, to the aqueous water-soluble polymer solution followed by dispersion of the dispersoid in the aqueous solution.

The aqueous water-soluble polymer solution can be prepared by adding the water-soluble polymer to water and stirring. For this, heating may also be carried out. The heating temperature is, for example, not less than 40° C. and not more than 100° C. Dispersion of the dispersoid in the aqueous water-soluble polymer solution may be carried out according to a known method. The following methods are specific examples: mixing the dispersoid with the aqueous water-soluble polymer solution at normal temperature while stirring, and mixing the dispersoid with the aqueous water-soluble polymer solution while heating followed by cooling to form an emulsion.

The dispersoid removal step is described in the following. The water and dispersoid are evaporated (volatilized in particular) and thereby removed in this dispersoid removal step. Because the dispersoid has a higher boiling point than that of water, the water undergoes preferential evaporation versus the dispersoid in this step. The water-soluble polymer precipitates as the water is depleted. At this point, the dispersoid, which has a higher boiling point than that of water and was dispersed in the emulsion, remains present in large amounts, but remains present dispersed in the water-soluble polymer. A porous framework of the water-soluble polymer is formed as a consequence. The evaporation and removal of the higher-boiling dispersoid results in the production of voids, thus yielding a porous material of the water-soluble polymer.

There are no particular limitations on the method for evaporating the water and dispersoid, and, for example, a method of applying heat, a method of placing under reduced pressure, a method of applying heat under reduced pressure, and a method of air-drying can be used. These methods can be performed in the same manner as known drying methods. The method of applying heat is desired from the standpoint of the ease of implementation of the process. The heating temperature is not particularly limited, but is desirably a temperature at which the emulsion does not boil and the water-soluble polymer and dispersoid do not undergo decomposition, and is more desirably not less than 50° C. and not more than 150° C. The emulsion is desirably allowed to stand during which the water and dispersoid are evaporated.

In order to obtain the porous material in a desired shape, a method of introducing the emulsion into a vessel having a shape corresponding to the desired shape, and applying heat thereto is advantageously employed. In order to obtain a film-shaped porous material, a method of coating the emulsion in the form of a thin film on a flat sheet and applying heat thereto is advantageously employed.

A porous material of the water-soluble polymer can be obtained proceeding as described above. The obtained porous material of the water-soluble polymer can be used in a variety of applications in conformity with the type of the water-soluble polymer. Examples of these applications are packing and packaging materials, construction materials, sound-absorbing materials, cleaning products, cosmetic products, separation membranes, adsorbents, carriers for purification, catalyst carriers, culture substrates, and so forth.

The present disclosure enables the production of a porous material of a water-soluble polymer through easy procedures, i.e., preparation of an emulsion and evaporation of water and a dispersoid. The present disclosure does not require the implementation, as in the prior art, of a cooling operation for precipitating a molded article and a solvent-substitution operation. The method according to the present disclosure for producing a porous material of a water-soluble polymer is thus very simple and convenient.

EXAMPLES

Examples pertaining to the present disclosure are described below, but this should not be construed to mean that the present disclosure is limited to or by that which is given in these examples.

Example 1

First, 2 parts by mass of polyvinyl alcohol and 10 parts by mass of water were added to a sample bottle. The sample bottle was heated to 80° C. to 90° C., and an aqueous polyvinyl alcohol solution was obtained by stirring until the polyvinyl alcohol was completely dissolved in the water. While stirring, 5 parts by mass of tetradecane and 1.5 parts by mass of a nonionic surfactant (polyoxyethylene cetyl ether) were added to the aqueous polyvinyl alcohol solution, and cooling was carried out to 25° C. An emulsion was thus obtained. The obtained emulsion was coated by casting onto an aluminum plate. This was introduced into a dryer set to 120° C. and was heated in order to evaporate and remove the water and tetradecane. A thin film was obtained on the aluminum plate as a result. A cross section of the obtained thin film was subjected to observation with a scanning electron microscope (SEM), and it was confirmed thereby that the thin film was a porous material. An SEM photograph of a cross section of the thin film obtained in Example 1 is given in FIG. 1 for reference.

Example 2

A thin film was obtained by the same manner as in Example 1, but not adding the nonionic surfactant, and changing the amount of tetradecane as dispersoid from 5 parts by mass to 10 parts by mass. A cross section of the obtained thin film was subjected to observation with a scanning electron microscope (SEM), and it was confirmed thereby that the thin film was a porous material.

Example 3

A thin film was obtained by the same manner as in Example 1, but changing the tetradecane as dispersoid to dodecane. A cross section of the obtained thin film was subjected to observation with a scanning electron microscope (SEM), and it was confirmed thereby that the thin film was a porous material.

Example 4

A thin film was obtained by the same manner as in Example 1, but not adding the nonionic surfactant, and changing the 5 parts by mass of tetradecane as dispersoid to 10 parts by mass of dodecane. A cross section of the obtained thin film was subjected to observation with a scanning electron microscope (SEM), and it was confirmed thereby that the thin film was a porous material.

Example 5

Figure 2:
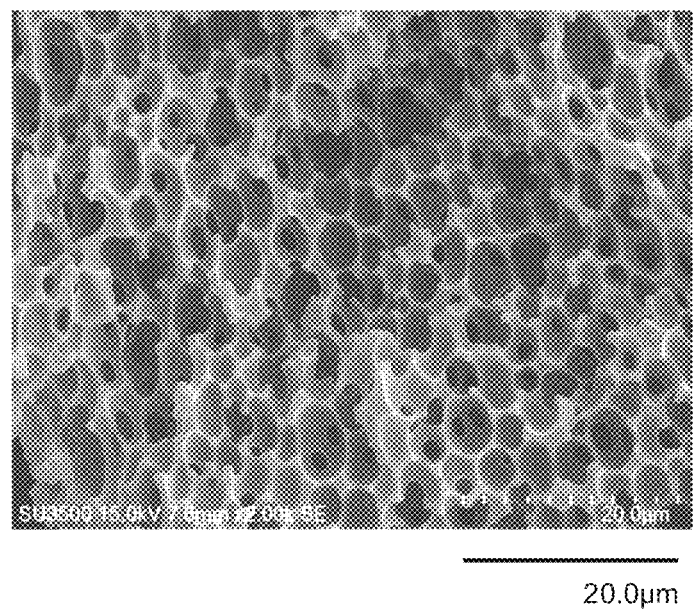
FIG. 2 is an SEM photograph of a cross section of the thin film obtained in Example 5.

First, 2 parts by mass of polyvinyl alcohol and 10 parts by mass of water were added to a sample bottle. The sample bottle was heated to 80° C. to 90° C., and an aqueous polyvinyl alcohol solution was obtained by stirring until the polyvinyl alcohol was completely dissolved in the water. While stirring, 10 parts by mass of propylene carbonate (2-oxo-4-methyl-1,3-dioxolane) was added to the aqueous polyvinyl alcohol solution, and cooling was carried out to 25° C. An emulsion was thus obtained. The obtained emulsion was coated by casting onto an aluminum plate. This was introduced into a dryer set to 75° C. and was heated in order to evaporate and remove the water and propylene carbonate. A thin film was obtained on the aluminum plate as a result. A cross section of the obtained thin film was subjected to observation with a scanning electron microscope (SEM), and it was confirmed thereby that the thin film was a porous material. An SEM photograph of a cross section of the thin film obtained in Example 5 is given in FIG. 2 for reference.

Example 6

A thin film was obtained by the same manner as in Example 5, but adding 0.25 parts by mass anionic surfactant (ammonium salt of an acrylic copolymer) to the aqueous polyvinyl alcohol solution and changing the dryer temperature to 60° C. A cross section of the obtained thin film was subjected to observation with a scanning electron microscope (SEM), and it was confirmed thereby that the thin film was a porous material.

Example 7

A thin film was obtained by the same manner as in Example 5, but changing the 2 parts by mass of polyvinyl alcohol to 1 part by mass of hydroxymethyl cellulose and changing the amount of propylene carbonate from 10 parts by mass to 2 parts by mass. A cross section of the obtained thin film was subjected to observation with a scanning electron microscope (SEM), and it was confirmed thereby that the thin film was a porous material.

Example 8

A thin film was obtained by the same manner as in Example 5, but changing the amount of polyvinyl alcohol to 2.5 parts by mass and changing the 10 parts by mass of propylene carbonate to 2.5 parts by mass of butylene carbonate (4-ethyl-1,3-dioxolan-2-one). A cross section of the obtained thin film was subjected to observation with a scanning electron microscope (SEM), and it was confirmed thereby that the thin film was a porous material.

Example 9

A thin film was obtained by the same manner as in Example 5, but changing the amount of polyvinyl alcohol to 2.5 parts by mass, changing the 10 parts by mass of propylene carbonate to 7.5 parts by mass of decamethylcyclopentasiloxane, and adding 2.5 parts by mass of a nonionic surfactant (polyglyceryl myristate) to the aqueous polyvinyl alcohol solution. A cross section of the obtained thin film was subjected to observation with a scanning electron microscope (SEM), and it was confirmed thereby that the thin film was a porous material.

The results of the above are given in Table 1 (the "∘" in the "porosification" column in the table indicates that porosification occurred). The results in Table 1 demonstrate that a porous material of a water-soluble polymer could be produced using the method according to the present disclosure.

TABLE 1

| | | dispersoid | | | | | | | |
|---|---|---|---|---|---|---|---|---|---|
| | water-soluble polymer | name | boiling point (° C.) | SP value | $\delta d$ | $\delta p$ | $\delta h$ | HSP value | surfactant | porosification |
| Example 1 | polyvinyl alcohol | tetradecane | 253.5 | 7.9 | 16.2 | 0 | 0 | 16.2 | nonionic | ∘ |
| Example 2 | polyvinyl alcohol | tetradecane | 253.5 | 7.9 | 16.2 | 0 | 0 | 16.2 | — | ∘ |
| Example 3 | polyvinyl alcohol | dodecane | 216 | 7.8 | 16 | 0 | 0 | 16.0 | nonionic | ∘ |
| Example 4 | polyvinyl alcohol | dodecane | 216 | 7.8 | 16 | 0 | 0 | 16.0 | — | ∘ |
| Example 5 | polyvinyl alcohol | propylene carbonate | 242 | 13.3 | 20 | 18 | 4.1 | 27.2 | — | ∘ |
| Example 6 | polyvinyl alcohol | propylene carbonate | 242 | 13.3 | 20 | 18 | 4.1 | 27.2 | anionic | ∘ |
| Example 7 | hydroxyethyl cellulose | propylene carbonate | 242 | 13.3 | 20 | 18 | 4.1 | 27.2 | — | ∘ |
| Example 8 | polyvinyl alcohol | butylene carbonate | | 12.1 | 18 | 16.8 | 3.1 | 24.8 | — | ∘ |
| Example 9 | polyvinyl alcohol | decamethylcyclopentasiloxane | 210 | 6.4 | 12.9 | 1.3 | 1 | 13.0 | nonionic | ∘ |

What is claimed is:

1. A method for producing a porous material of a water-soluble polymer, comprising
    a step of preparing an emulsion comprising the water-soluble polymer, water, and a dispersoid, wherein the water-soluble polymer is dissolved and the dispersoid is dispersed in the emulsion; and
    a step of evaporating and thereby removing the water and the dispersoid from the emulsion by heating the emulsion to 50 to 150° C. to obtain a film-shaped porous material,
    wherein the boiling point of the dispersoid is at least 100° C. higher than the boiling point of the water,
    the solubility of the water-soluble polymer in the dispersoid at 25° C. is lower than the solubility of the water-soluble polymer in the water at 25° C.,
    the water-soluble polymer has a solubility in water at 25° C. of at least 1 mass %, and
    the film-shaped porous material consists of the water-soluble polymer.

2. The production method according to claim 1, wherein the dispersoid is an alkane compound, an alkylene carbonate, or a silicone compound.

3. The production method according to claim 1, wherein the water-soluble polymer is a hydroxyl group-containing water-soluble polymer.

4. The production method according to claim 1, wherein the water-soluble polymer is a polyvinyl alcohol polymer.

* * * * *